(12) United States Patent
Barrall

(10) Patent No.: US 6,403,180 B1
(45) Date of Patent: *Jun. 11, 2002

(54) PIPE INSULATION

(75) Inventor: Jeffery L. Barrall, Lancaster, PA (US)

(73) Assignee: Armacell Enterprises GmbH

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,635

(22) PCT Filed: Nov. 22, 1996

(86) PCT No.: PCT/US96/18281

§ 371 (c)(1),
(2), (4) Date: May 28, 1998

(87) PCT Pub. No.: WO97/48932

PCT Pub. Date: Dec. 24, 1997

(51) Int. Cl.[7] .............................. B29D 23/00; B32B 5/18
(52) U.S. Cl. ................ 428/36.5; 428/34.5; 428/36.9; 428/36.91; 428/35.2; 138/141; 138/147; 138/149; 138/156; 138/170; 138/175
(58) Field of Search .................... 428/36.9, 36.91, 428/402, 446, 34.5, 35.2, 36.5; 138/32, 106, 147, 148, 149, 175, 177, 141, 156, 170

(56) References Cited

U.S. PATENT DOCUMENTS

| | | | |
|---|---|---|---|
| 3,941,159 A | 3/1976 | Toll | 138/147 |
| 4,221,672 A | 9/1980 | McWilliams | 252/62 |
| 4,348,243 A | 9/1982 | Craubner | 156/71 |
| 4,447,345 A | 5/1984 | Kummermehr et al. | 252/62 |
| 4,772,507 A * | 9/1988 | Leo, Jr. et al. | 428/218 |
| 4,857,371 A | 8/1989 | McClintock | 428/36.5 |
| 4,874,648 A | 10/1989 | Hill et al. | 428/35.9 |
| 4,937,111 A | 6/1990 | Fontanilla | 428/34.1 |
| 5,123,453 A | 6/1992 | Robbins | 138/149 |
| 5,569,513 A * | 10/1996 | Fidler et al. | 428/35.6 |

FOREIGN PATENT DOCUMENTS

EP 0 520 437 A1 12/1992

* cited by examiner

*Primary Examiner*—Rena L. Dye
(74) *Attorney, Agent, or Firm*—Womble Garlyle Sandridge & Rice, PLLC

(57) ABSTRACT

An insulating system for pipes is provided which includes at least two different types of pipe insulation, wherein each pipe insulation is a pipe jacket formed by two mating sections, a first section and a second section with each section having a mating surface, wherein further when the two mating sections are put together with the mating surface of the first section exactly abutting the mating surface of the second section, they form a tubular structure having a bore which is a suitable size to receive a pipe. Of the three possible types of pipe insulation available, insulation A, insulation B, and insulation C, each pipe insulation type is formulated to insulate pipes having a different surface temperature, and yet pipe insulations A, B, and C each have identical outer diameters.

22 Claims, 5 Drawing Sheets

PIPE INSULATION

This application is a 371 of PCT/US96/18281 filed on Nov. 22, 1996, now WO 97/48932.

BACKGROUND OF THE INVENTION

1. Field of the Invention

This invention relates to insulation for pipes. Advantageously, the pipe insulation described herein can insulate pipes having different surface temperatures although each pipe jacket will have the same wall thickness.

Thermal insulation is an important and valuable product. Although many insulative products are already in use, there is a continuing desire for energy conservation pushing a drive to achieve better insulation having more advantages.

Presently, with pipe insulation, pipe jackets are used to cover the pipes. Since pipes have different temperatures, different insulating jackets are needed. Hotter pipes require more of the insulating material. This necessitates larger pieces of insulation. Larger jackets are, therefore, used for the hotter pipes.

The larger pipe jackets take up more of the limited inventory space, and more product space is needed to store the pipe jackets, especially on the job site. In addition to this, the different sizes of pipe jackets necessitate that different sizes of pipe accessories be stocked (one size for each different size of jacket).

Advantageously, the pipe jacketing described herein provides a uniform outer diameter for the different jackets in spite of the different surface temperatures of the pipes to be covered. Less space is needed to store the insulation. Furthermore, since the jackets have a uniform size, there is the further advantage of requiring only one size in each accessory (cladding, pipe hangers, saddles, butt straps, etc).

2. Brief Description

A pipe insulating system comprises at least two different types of pipe insulation, wherein each pipe insulation is a pipe jacket formed by two mating sections, a first section and a second section with each section having a mating surface, wherein further when the two mating sections are put together with the mating surface of the first section exactly abutting the mating surface of the second section, they form a tubular structure having a bore which is a suitable size to receive a pipe.

There are three possible types of pipe insulation available. These are insulation A, insulation B, and insulation C. Each pipe insulation type is formulated to insulate pipes having a different surface temperature, and yet pipe insulations A, B, and C each have identical outer diameters. Insulation B is formulated to insulate pipes having a surface temperature up to about 230° C., insulation A is formulated to insulate pipes having surface temperatures up to about 175° C., and insulation C is formulated to insulate pipes having a surface temperature up to about 350° C., wherein further, the lengths of insulation A, B and C have identical outer diameters.

In some embodiments, the pipe jacket will have more than one layer in the jacket. For example, in the insulation jackets for pipes having surface temperatures of up to about 230° C. and up to about 350° C. more preferably each have at least two layers.

The layers are concentric rings which are centered around the bore of the jacket. The inner layers (both intermediate and core layers) always have a thermal conductivity which, at the temperatures to be insulated, is lower than or equal to the thermal conductivity of the material in the outer layers of the jacket. Preferably, the core layer will have the lowest thermal conductivity at the temperatures to be insulated than the material in any other outer layer or layers. For the hotter pipes preferably a thicker core layer is used, or more efficient insulation can be used in the inner layer or layers. A more efficient insulation for the appropriate temperature gradient allows the inner layer to be thinner and yet still insulate the hotter pipe. For the cooler pipes having temperatures up to about 175° C., the jacket is most preferably in a single layer.

The jackets are formulated for pipes having different temperatures by using one or more of the following options: 1) different types of insulative materials or 2) more effective amounts of insulative material inside. For two and three-layer jackets, each inner layer will always be at least as efficient as the outer layers. Preferably they are more efficient and thus have a lower thermal conductivity at the temperatures to be insulated than does the outer layers. The inner-most layer(s), thus, are preferably more effective insulators. The inner layers are always capable of withstanding operational temperatures.

Using multiple layers and more efficient insulation to achieve sufficient insulation at higher temperatures does away with the need to use a thicker layer to achieve the same result.

BRIEF DESCRIPTION OF THE DRAWINGS

FIG. 1 shows substantially identical mating sections 1 and 2 of the pipe jacket (covering). Each of the sections has an optional adhesive-coated mating surface 3 and 4 of each section with the protective sheet of release paper 5 in between the mating surfaces to prevent them from sticking to each other. When the sections 1 and 2 are placed together, they form a tubular structure which is a jacket for the pipe. The tubular structure (or jacket) has a bore 6 which has a suitable size to receive a pipe.

From FIGS. 3, 4, 5 and 6, it can be noted that the pipe jackets have a single, uniform outer diameter.

Figure 1:
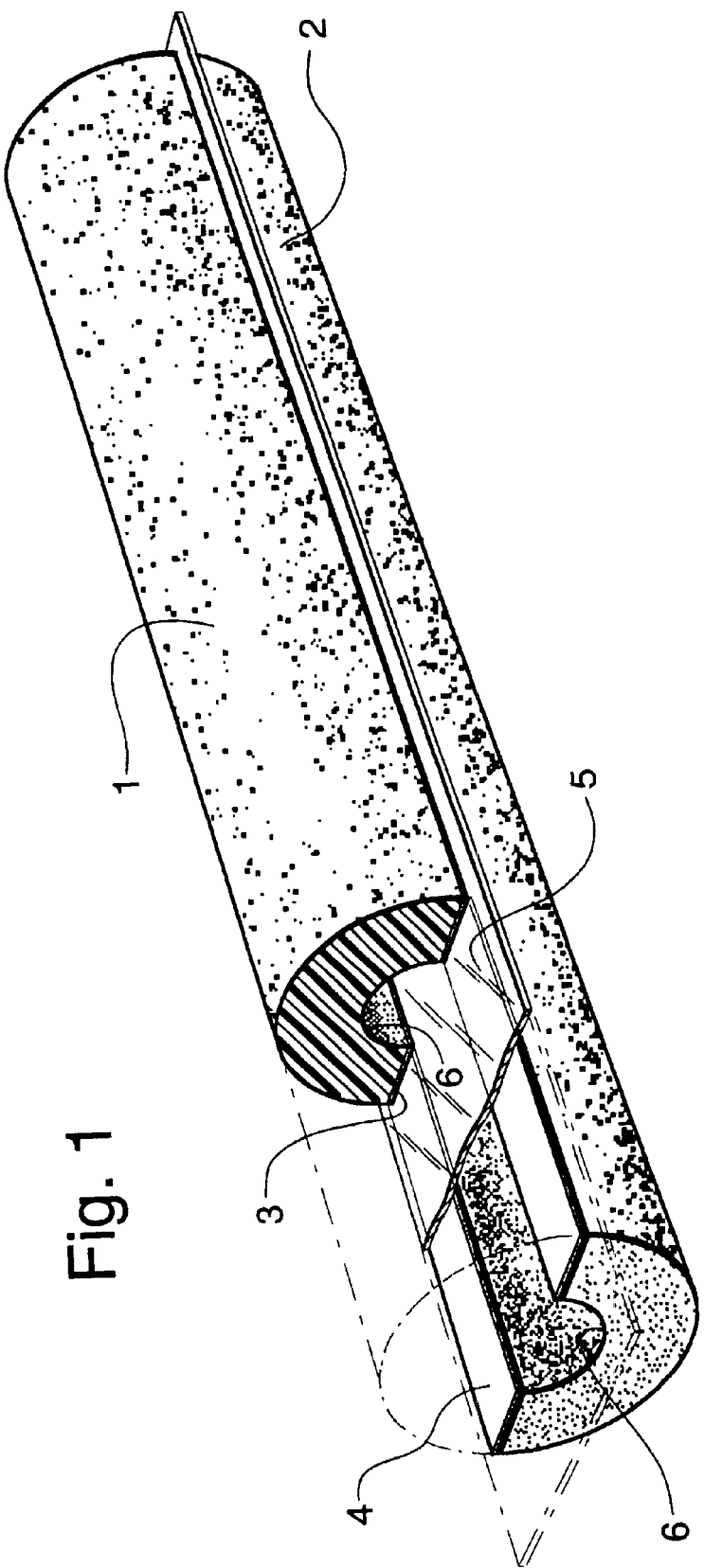
FIG. 1 is a view of the pipe insulation most preferably for covering pipes having surface temperatures up to about 175° C., although such single-layer insulation could be used for all three temperatures by putting a greater amount of insulative material or a more highly effective insulative material into the layer. Such highly effective insulation for example is described in U.S. Pat. No. 5,569,513.
Figure 2:
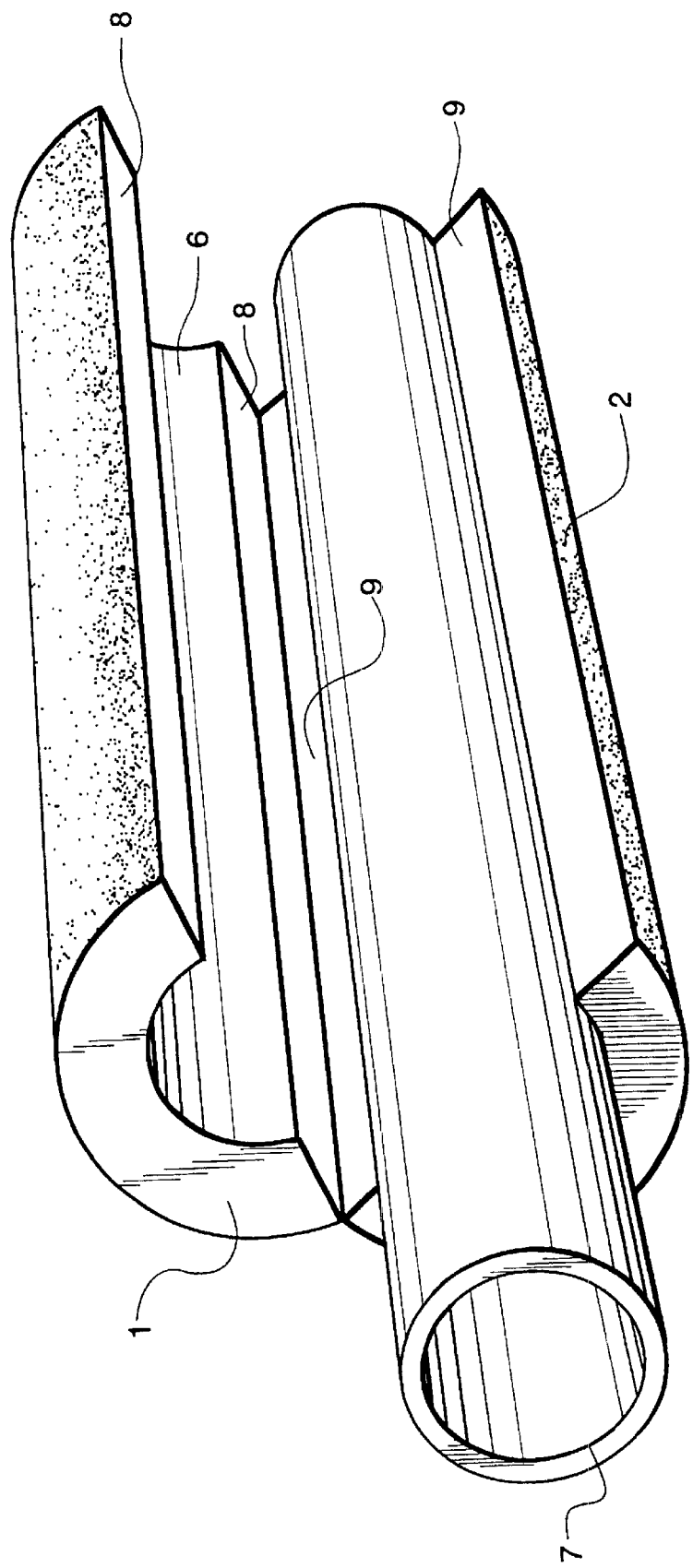
FIG. 2 is a view of a pipe jacket also most preferably for pipes having surface temperatures up to about 175° C. The jacket is in an open position with a pipe 7 in one section and the exposed, substantially identical mating surfaces 8 and 9. The two sections can be placed together and secured by suitable means for holding the sections in place (such as ties or cladding). Alternatively, as in FIG. 1, a pressure sensitive adhesive can be used so that the two identical mating sections 1 and 2 can be put together so that the mating surfaces touch and stick to each other.
Figure 3:
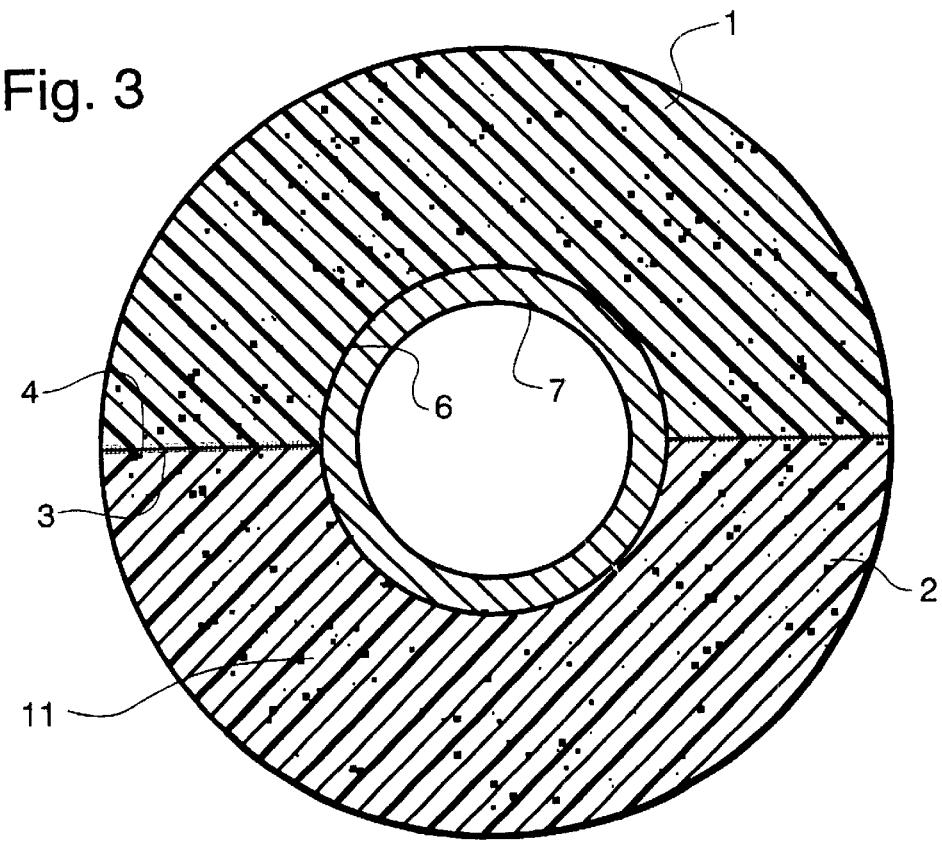
FIG. 3 is a cross sectional view through the pipe jacket, preferably for pipes having surface temperatures up to about 175° C. Mating sections 1 and 2 are shown along with the mating surfaces 3 and 4, the bore 6, and pipe 7. The jacket has a single layer 11 made of insulative material, and is preferably for pipes with surface temperatures up to about 175° C.
Figure 4:
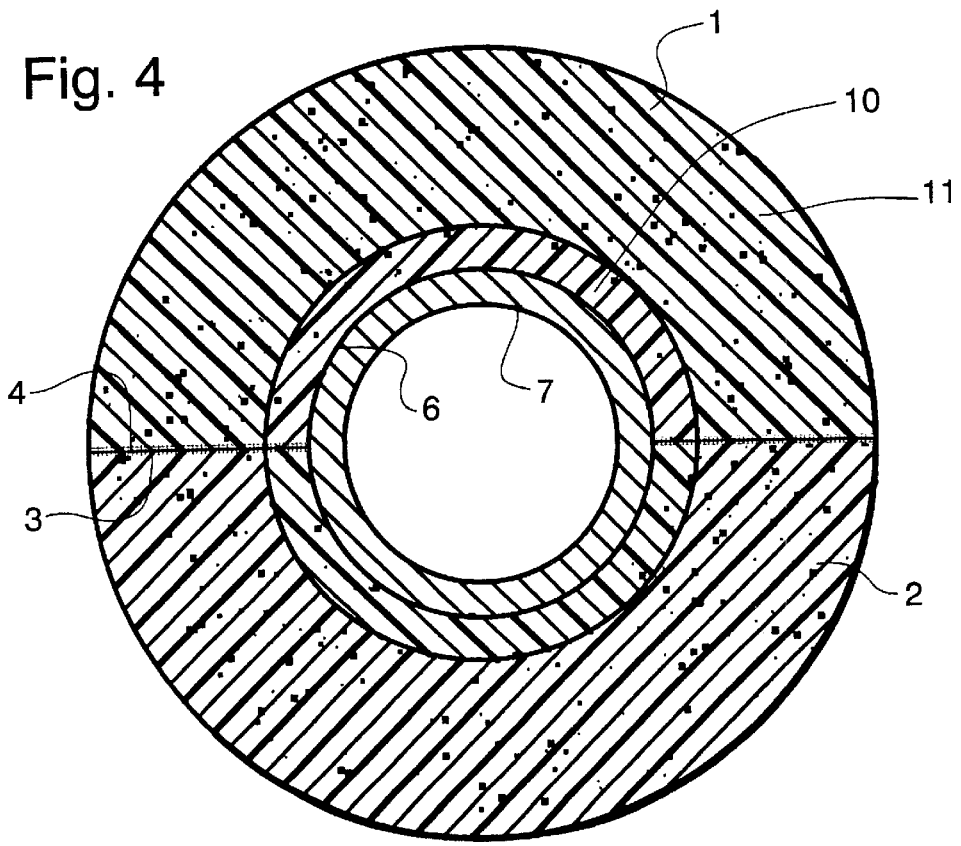
FIG. 4 is a cross sectional view through the pipe jacket, preferably for pipes having surface temperatures up to about 230° C. Mating sections 1 and 2 are shown along with the mating surfaces 3 and 4, the bore 6, and pipe 7. Since the jacket has two layers, the core (inner) layer 10 is made of insulative material at least as efficient as the outer layer 11.
Figure 5:
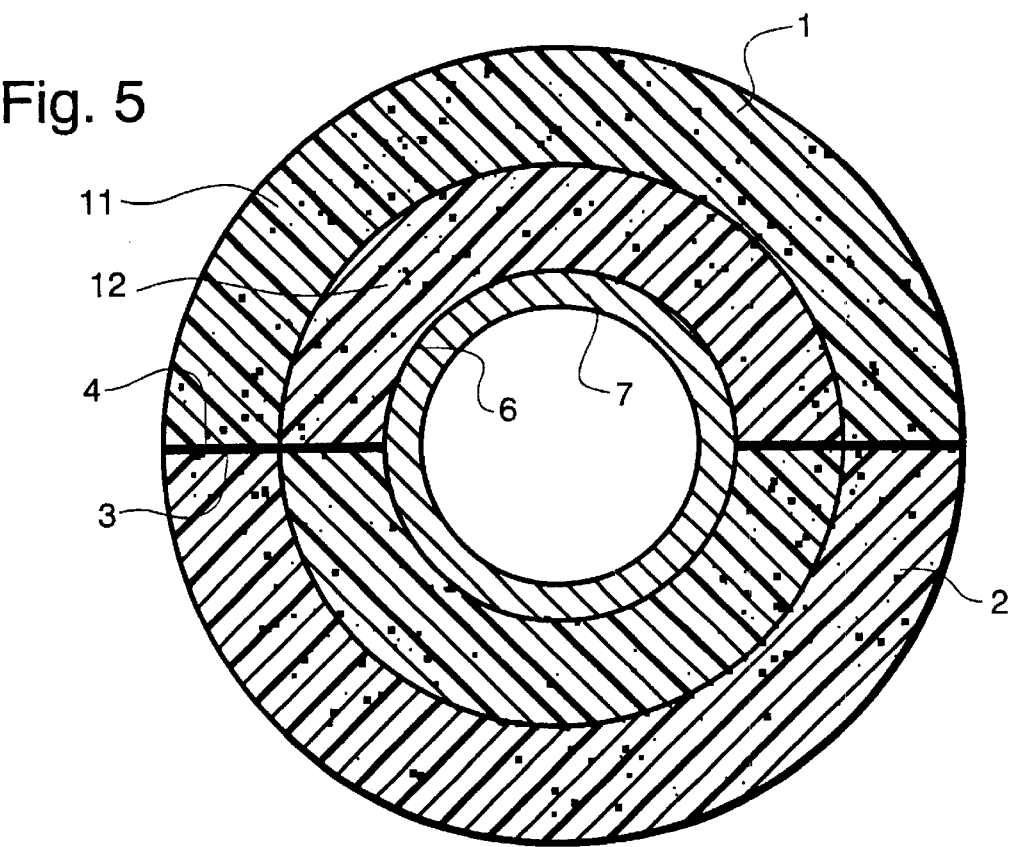
FIG. 5 is a cross sectional view through the pipe jacket, preferably for pipes having surface temperatures up to about 350° C. Mating sections 1 and 2 are shown along with the mating surfaces 3 and 4, the bore 6, and pipe 7. Since the jacket has two layers, preferred for pipes with surface temperatures up to about 350° C., the core (inner) layer 12 is made of insulative material at least as efficient as the outer layer 11.
Figure 6:
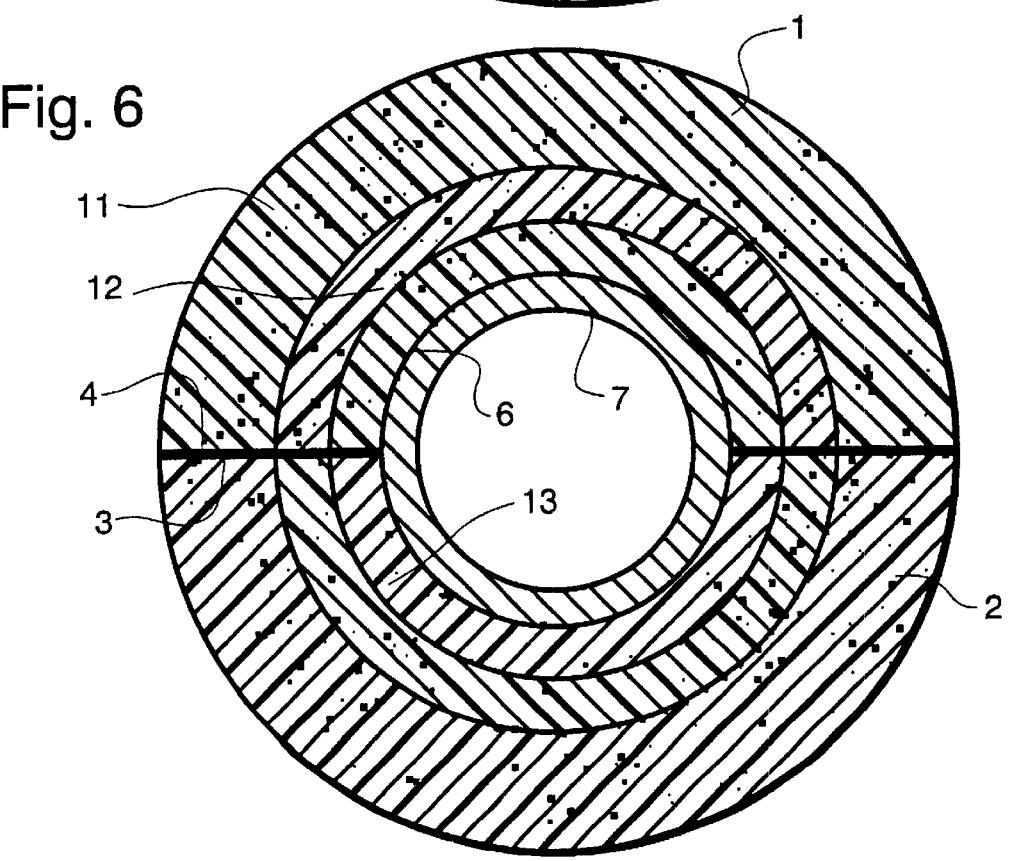
FIG. 6 is a cross sectional view through the pipe jacket, preferably for pipes having surface temperatures up to about 350° C. Mating sections 1 and 2 are shown along with the mating surfaces 3 and 4, the bore 6, and pipe 7. Since the jacket has three layers, and is for pipes with surface temperatures up to about 350° C., the core (inner) layer 13 is made of insulative material at least as efficient as the outer layers 11 and 12.
Figure 7:
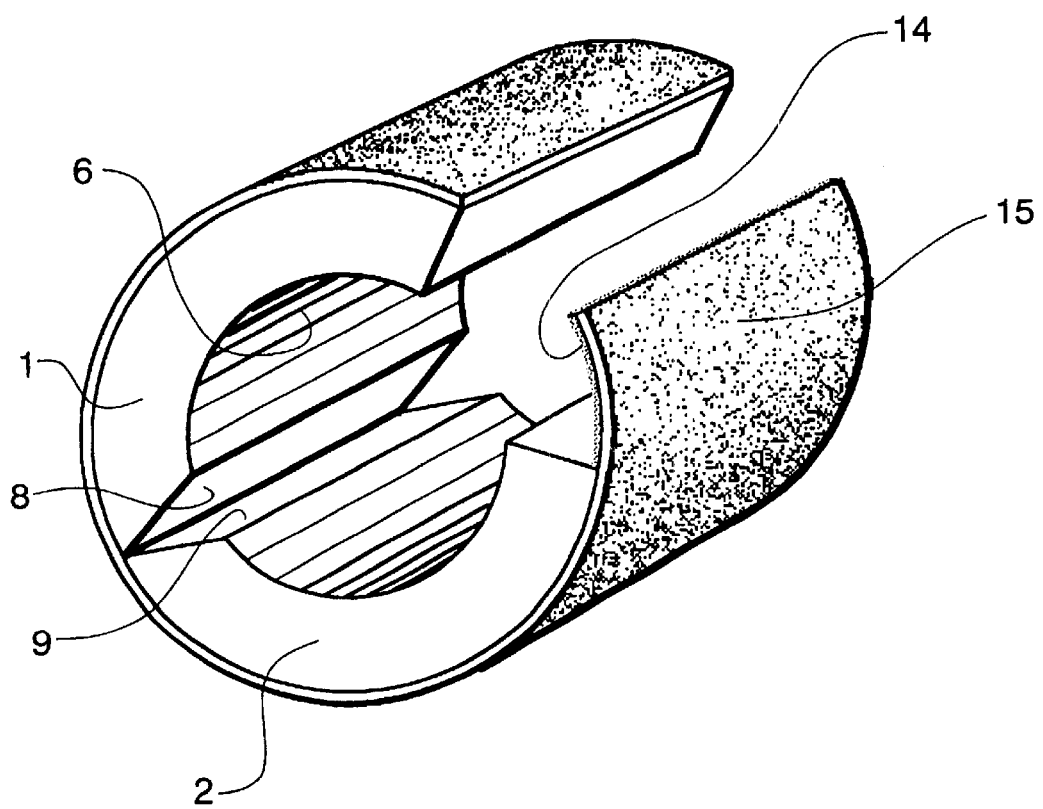

FIG. 7 shows a section of a pipe jacket with mating sections 1 and 2 and the exposed, substantially identical mating surfaces 8 and 9 with the bore 6 for receiving the pipe. An all service covering 15 is shown for the jacket and an adhesive strip 14 on the inner side so that the jacket can be secured in the closed position around the pipe.

DETAILED DESCRIPTION

The terms jacket and pipe jacket is used throughout to indicate the insulated pipe covering.

The present insulation provides a system of pipe jackets (insulation A, B, and C) which have the same outer diameter, thus taking up the same amount of space, and yet the different insulation jackets will insulate pipes having different surface temperatures. The insulation can cover any size pipe. While the size of the pipes is not critical, they will generally range from about 0.5 inches to about 12 inches. The thickness of the insulation which is set for the jackets can vary depending on the amount of insulative material actually used, but the jackets for different temperatures will have the same size.

Furthermore, although the size of the insulative jacket can vary, preferably the insulative jacket can have insulative material in 1 or more layers that all together are up to about 4 inches thick. It is, however, an advantage of the present insulation to conserve space by making the insulative jacket smaller in diameter. Thus, it is more preferred to have the insulation in one or more layers that all together are up to about 2.5 inches thick.

Many advantages are obtained from this system of pipe covering insulation. Advantageously, insulation having more efficiency is obtained with less space being taken up. This also allows more linear feet of insulation to be packed in the same volume of space (due to the thinner walls). Warehouse space, advantageously, will hold more value per cubic yard. In addition to this, when the present insulation is employed, calculating space between pipes is much simpler for a builder because the pipe covering will all be the same size.

For the insulation pipe jackets which insulate pipes having a surface temperature up to about 175° C. preferably, a single layer of insulation material is prepared, suitably by such methods as cutting, molding, or extruding. The layers are suitably prepared in the semi-circular shape needed for one section of the pipe jacket (made up of two semi-circular halves). After obtaining the two semi-circular halves of one jacket length, it is preferred that adhesive and release paper are put onto all of the mating surfaces so that the pipe jacket can be installed around a pipe easily.

For jackets having more than one layer, with the inner layers, the insulation material used must be at least as efficient or, preferably, more efficient than the outer layer material. Thus, the inner layer or layers are made from material that will insulate at least as effectively as the outer layers. To this extent, the make-up of the inner layers is determined by what is used in the outer layer. Each inner layer has an effective amount of insulative material to give the layer a thermal efficiency at least equal to the thermal efficiency of the outer layer. Preferred inner layers are composites made of a material selected from the group consisting of glass wool, mineral wool, aerogel, calcium silicate, fumed silica, perlite and mixtures thereof. These materials, however, could also be used in single-layer insulation jackets, and furthermore preferably are used when single-layer jackets are formulated to insulate the hotter pipes (insulation B and C).

It is noted that aerogel has been known to be thermally insulative, but is not extensively used as insulation due to the expense. With the instant invention, however, aerogel and aerogel composites are preferred and opportunities for its use is greatly improved due to the cost savings provided by the insulative system described herein. Thus, it is preferred to have aerogel insulation held in a matrix material having suitable fire and smoke properties for insulation. Such a matrix material can, for example, be provided by clay, gelatin, or phenolics such as phenolic formaldehyde. Such insulative aerogel materials, for example, are described in U.S. Pat. No. 5,569,513. These aerogel insulation materials can be used as the preferred insulation of the inner layers of the present invention.

Preferred materials which can be used to prepare an outer layer are: cork, perlite, calcium silicate, fumed silica, and glass fiber, mineral wool, cellulosic fiber, phenolic foam, urethane foam and mixtures thereof. Such materials can also be used to formulate single-layer jackets for cooler pipes. In some instances, it may be desired to use these materials in intermediate layers of multiple-layered jackets.

The layer materials can also be made of thermoplastic or elastomeric foams. The compositions which can also be used as the inner layer(s) are: phenolic foams and urethane foams when temperatures permit, and composites of an aerogel in a matrix binder.

For the insulation pipe coverings which insulate pipes having the higher surface temperatures each semi-circular half will preferably have at least two layers. Suitably, each layer is separately molded or extruded. The separate layers are then fitted together to form each semi-circular half of the jacket. Any suitable means can be used to hold the layers together. Preferably adhesive is used to hold the layers together. After obtaining two semi-circular halves of one jacket length, it is preferred that adhesive and release paper are put onto all of the mating surfaces.

To close and hold the insulation to the pipe, any suitable means can be used. For example, a pipe wrap can be put around the outside of the insulation, holding the mating surfaces together and holding the insulation on the pipe. Alternatively, an adhesive coating can be put on at least one surface which will be brought into contact with and hold the mating surface (which can also optionally have adhesive) on the other section of the pipe jacket (covering). Preferably, both surfaces will have an adhesive so that the sections will be secured to each other and held together by the cohesion of the adhesives. A layer of protective sheet material can be put over the adhesive on the coated surface of each pipe covering section to keep it from sticking until it is ready for installation. Commercially available wrapping can also be used.

Although the outer temperature of the pipe insulation on the insulated pipe is not critical, all three types of insulation will preferably insulate so that the outer surface of the pipe insulation is less than about 60° C.

The present invention may be more completely understood from the examples which follow. These examples are intended to illustrate the present invention and should not be taken to limit it. All parts and percentages are by weight unless otherwise specified.

EXAMPLE 1

Blocks were prepared of the insulative material which were to be used for each layer. Two halves of each of the circular layers were then cut out of the block. The layers were then fitted together and each half of the pipe insulation was then mated together. The halves were secured together by using pipe cladding as an outside wrap for the insulation.

For insulation A, formulated to cover pipes having surface temperatures up to 175° C., a two single layers of phenolic formaldehyde foam was cut from a block. Each half of the layer was 1 inch thick and had a radius and curvature suitable to fit around a pipe which was 2 inches in diameter. The layers were mated together and secured.

For insulation B, formulated to cover pipes having surface temperatures up to 230° C., two layers of an aerogel composite were cut out (one layer for each half of the pipe). The layers were each ¼ inch thick and were cut to be the inner (core) layer of a two layer pipe insulation. The composite material was 90 parts by weight of the aerogel and 150 parts by weight of gelatin. The outer layer was cut from a block of phenolic formaldehyde foam. The outer layer was ¾ inch thick for each half of the pipe. The layers were fitted together to form each half of the insulation. The complete pipe insulation was then formed by fitting each half together.

For insulation C, formulated to cover pipes having surface temperatures up to 350° C., two layers of an aerogel composite were cut out (one layer for each half of the pipe). The layers were each ½ inch thick, and were cut to be the inner (core) layer of a two layer pipe insulation. The composite material was 80% aerogel and 20% clay. The outer layer was cut from a block of phenolic formaldehyde foam. The outer layer was also ½ inch thick for each half of the pipe. The layers were fitted together, putting the aerogel composite in as the inner (core) layer and the phenolic foam as the outer layer of the pipe. Each half of the pipe insulation was then fitted together and secured.

EXAMPLE 2

This example demonstrates the reduction of temperature to be expected from the layered pipe insulation.

Two rectangular layers of insulation were prepared. Each layer measured 6 inches long and 6 inches wide. The layers were placed together and were put on a hot surface. The temperature was then allowed to come to an equilibrium. The temperature of the hot surface was measured directly, and the temperature of the interface between the layers was measured, as was the temperature of the surface.

For Example 2, the bottom layer was 80% aerogel and 20% clay. This layer was ½ inch thick. The top layer was a phenolic formaldehyde foam and was also ½ inch thick. The results of the temperature measurement are as follows.

The heated surface was measured at 254° C.

The interface between the layers was 139° C.

The surface of the two layer sample was 47° C.

EXAMPLE 3

Using the method of Example 2, a layered sample was prepared. The bottom layer was foam glass and was 1 inch thick, the top layer was phenolic foam and was ½ inch thick. The results of the temperature measurement are as follows.

The heated surface was measured at 259° C.

The interface between the layers was 144° C.

The surface of the two layer sample was 46° C.

The above Examples 2 and 3 show that, for approximately the same heated surface temperature, 1 inch of layered insulation (in Example 2) gives nearly the same surface temperatures as 1.5 inches of the layered insulation in Example 3. Thus, by optimizing the inner layer and using the more expensive aerogel composite, a thinner insulation can be provided. Under the principles of the present invention, this allows valuable space to be saved.

Additionally, it is noted that the thermal conductivity of the foam glass of Example 3 is relatively high even compared to the phenolic foam. Since the phenolic foam cannot withstand temperatures in excess of 150° C., a full 1 inch of foam glass is needed before a phenolic layer can be used. Example 3 requires thicker insulation to accomplish the same insulation properties as Example 2 demonstrates with 1 inch of a two-layered insulation at the surface temperatures used.

The two Examples 2 and 3 also demonstrate that layered insulation can be built by using different and more thermally resistant materials as inner layers where they experience high temperatures. Furthermore, the overall insulation can be made thinner by using insulative materials that are more efficient (having a lower thermal conductivity at the higher temperatures). Thus, it can be seen that by using a layered system with low thermal conductivity insulation for the hotter pipes, the thickness of the insulation can be reduced further allowing a pipe insulating system for different temperature pipes to be provided while still maintaining insulative pipe coverings that have the same diameter.

I claim:

1. A pipe insulating system comprising at least two different layered insulations selected from the group consisting of 1) at least one layer of insulation A and at least one layer of insulation B, 2) at least one layer of insulation B and at least one layer of insulation C, and 3) at least one layer of insulation A and at least one layer of insulation C, wherein each of such insulations is a pipe jacket formed by two mating sections of the same insulation, a first section and a second section, with each section having a mating surface, wherein further when the two mating sections are put together with the mating surface of the first section abutting the mating surface of the second section, they form a length of tubular structure having a bore which is a suitable size to receive a pipe, wherein further, insulation B is formulated to insulate pipes having a surface temperature up to about 230° C., and insulation A is formulated to insulate pipes having a surface temperature up to about 175° C., and insulation C is formulated to insulate pipes having a surface temperature up to about 350° C., wherein further, the pipe jackets of insulations 1), 2), and 3) all have the same outer diameter.

2. A pipe insulating system as described in claim 1 wherein at least one pipe jacket insulation has two circular layers around the bore of the structure wherein further, when the mating surfaces are together in this two layered insulation, the layers are centered as rings in the tubular structure with a core layer abutting the bore and a second, outer layer around the core layer, wherein further the core layer is an inner layer comprising a core material which has a lower thermal conductivity than the material in the second, outer layer.

3. A pipe insulating system as described in claim 1 wherein at least one pipe jacket insulation, when the two mating sections are put together with the mating surface of the first section exactly abutting the mating surface of the second section, the insulation has a single circular layer around the bore of the structure.

4. A pipe insulating system as described in claim 2 wherein both insulation B and insulation C are present, and each have two layers.

5. A pipe insulating system as described in claim 2 where one jacket has two layers, wherein the core material is a composite of an aerogel in a matrix material.

6. A pipe insulating system as described in claim 4 wherein the core material of both insulation B and insulation C is a composite of an aerogel in a matrix material.

7. A pipe insulating system as described in claim 2 wherein the core layer is a phenolic foam, a urethane foam, or a composite of an aerogel in a matrix.

8. A pipe insulating system as described in claim 3 wherein the single layer is made of a material selected from the group consisting of cork, perlite, calcium silicate, fumed silica, and glass fiber, mineral wool, cellulosic fiber, phenolic foam, urethane foam and mixtures thereof.

9. A pipe insulating system as described in claim 2 wherein the outer layer is made of a material selected from the group consisting of cork, perlite, calcium silicate, fumed silica, and glass fiber, mineral wool, cellulosic fiber, phenolic foam, urethane foam and mixtures thereof.

10. A pipe insulating system as described in claim 1 wherein at least one pipe jacket has more than one layer, and at least one inner layer is a composite made with a material selected from the group consisting of glass wool, mineral wool, aerogel, calcium silicate, fumed silica, perlite and mixtures thereof.

11. A pipe insulating system as described in claim 6 wherein the matrix contains clay, gelatin, or phenolic foam.

12. A pipe insulating system as described in claim 10 wherein at least one inner layer is a composite containing aerogel.

13. A pipe insulating system as described in claim 10 wherein at least one pipe jacket has three layers.

14. A pipe insulating system as described in claim 1 further comprising a pipe wrap.

15. A pipe insulating system as described in claim 1 wherein each pipe jacket will insulate a pipe whereby the outer surface of the pipe jacket is less than about 60° C.

16. A pipe insulating system as described in claim 1 wherein at least one pipe jacket has a layer which is a composite made with a material selected from the group consisting of glass wool, mineral wool, aerogel, calcium silicate, fumed silica, perlite and mixtures thereof.

17. A pipe insulating system as described in claim 1 wherein at least one pipe jacket has a layer made with a material selected from the group consisting of: cork, perlite, calcium silicate, fumed silica, and glass fiber, mineral wool, cellulosic fiber, phenolic foam, urethane foam and mixtures thereof.

18. A pipe insulating system as described in claim 1, further comprising an adhesive coating disposed on at least one mating surface for attaching the mating surfaces of the first and second sections to one another.

19. A pipe insulating system as described in claim 18, further comprising a releasable protective sheet disposed on the adhesive coating.

20. An insulating system for insulating a surface having an elevated temperature comprising:
   an insulation composite comprising at least two different layers of insulations, wherein the composite includes:
   a) at least one layer of insulation A and at least one layer of insulation B,
   b) at least one layer of insulation B and at least one layer of insulation C, or
   c) at least one layer of insulation A and at least one layer of insulation C,
   wherein insulation A is formulated to insulate pipes having a surface temperature up to about 175° C., insulation B is formulated to insulate pipes having a surface temperature up to about 230° C., and insulation C is formulated to insulate pipes having a surface temperature up to about 350° C., and
   wherein the layer or layers positionable proximate the surface are made from material that will insulate at least as effectively as the layer distal from the surface.

21. An insulating system for insulating a surface having an elevated temperature comprising:
   an insulation composite comprising at least two different layers of insulations, wherein the composite includes:
   a) at least one layer of insulation A and at least one layer of insulation B,
   b) at least one layer of insulation B and at least one layer of insulation C, or
   c) at least one layer of insulation A and at least one layer of insulation C,
   wherein insulation A is formulated to insulate pipes having a surface temperature up to about 175° C., insulation B is formulated to insulate pipes having a surface temperature up to about 230° C., and insulation C is formulated to insulate pipes having a surface temperature up to about 350° C., and
   wherein the layer or layers positionable proximate the surface have an effective amount of insulative material to provide such layer a thermal efficiency substantially equal to the thermal efficiency of the layer distal from the surface.

22. An insulating system for insulating a surface having an elevated temperature comprising:
   an insulation composite comprising at least two different layers of insulations, wherein the composite includes:
   1) at least one layer of insulation A and at least one layer of insulation B,
   2) at least one layer of insulation B and at least one layer of insulation C, or
   3) at least one layer of insulation A and at least one layer of insulation C,
   wherein insulation A is formulated to insulate pipes having a surface temperature up to about 175° C., insulation B is formulated to insulate pipes having a surface temperature up to about 230° C., and insulation C is formulated to insulate pipes having a surface temperature up to about 350° C., and
   wherein insulations A, B and C have the same thickness.

* * * * *

UNITED STATES PATENT AND TRADEMARK OFFICE
CERTIFICATE OF CORRECTION

PATENT NO. : 6,403,180 B1  
DATED : June 11, 2002  
INVENTOR(S) : Jeffery L. Barrall It is certified that error appears in the above-identified patent and that said Letters Patent is hereby corrected as shown below:

<u>Title page,</u>
Item [73], Assignee, replace "Armacell Enterprises GmbH" with -- Armacell Enterprise GmbH --.

Signed and Sealed this

Fourteenth Day of January, 2003

JAMES E. ROGAN
*Director of the United States Patent and Trademark Office*